Figure 1:
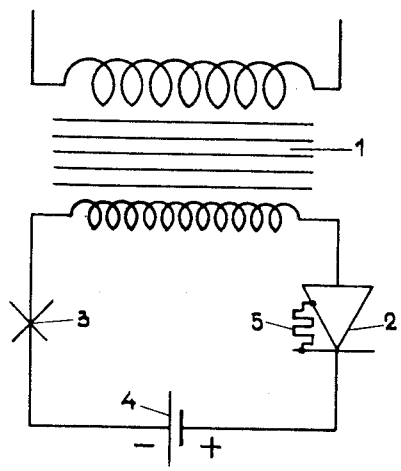

June 26, 1956               E. BEER               2,752,550
PROCESS AND APPARATUS FOR RENEWING EXHAUSTED PRIMARY, MORE
PARTICULARLY DRY, ELECTRIC CELLS OR BATTERIES
Filed April 15, 1952

Inventor
Ernst Beer
By Robert E. Burns
Attorney

United States Patent Office 2,752,550
Patented June 26, 1956

2,752,550
PROCESS AND APPARATUS FOR RENEWING EXHAUSTED PRIMARY, MORE PARTICULARLY DRY, ELECTRIC CELLS OR BATTERIES

Ernst Beer, The Hague, Netherlands

Application April 15, 1952, Serial No. 282,378

Claims priority, application Netherlands May 7, 1951

3 Claims. (Cl. 320—4)

The invention relates to a process for renewing or reactivating exhausted primary, more particularly dry, electric cells or batteries, in which a direct current is passed through the cells or batteries.

Such processes, in which direct current is used, either continuously or with short or longer interruptions, are already known. The use of direct current, however, causes several difficulties by that as well at the positive pole as at the negative pole gas generation takes place, whereby either only very low currents can be used, causing long reactivation times, or an irregular increase of the voltage and a poor reactivation are obtained. The gas generation further can lead to mechanical stresses in the cells, which can result in leaking out of electrolyte or damage of the cells. Furthermore soluble manganese connections can be formed which are reduced again to insoluble connections at the negative pole and affect the life of the cells or batteries. Besides the zinc can be deposited in the form of needles, which can result in internal short circuits. In addition, when using direct current, electrophoresis of the colloidal electrolyte can take place. All the above difficulties had as a consequence that up till now such methods were not suitable in practice and were unsuccessful.

The invention now aims at providing a method with which the above difficulties can be met and which is reliable and suitable in practice.

According to the invention surprisingly this has proved possible if a current of adequate strength is passed through the cells or batteries, consisting preponderatingly of pure alternating current and the remainder of direct or pulsating direct current. It has proved, that in this way batteries or cells of very divergent dimensions can be reactivated with very favourable results and proportionally very high direct currents can be used without meeting with the difficulties of gas generation or needle-shaped zinc depositing or soluble manganese connections or other difficulties which were met with up till now. Also it was determined that no or practically no electrophoresis takes place, in any way not in a manner having any unfavourable influence. The storability of batteries reactivated according to the invention is not less than of fresh batteries. Also the number of times that a cell or battery can be reactivated according to the invention is considerably higher than with the methods hitherto applied in which only direct current was used.

Very favourable results, that is to say a quick renewing or reactivation without difficulties or unfavourable consequences for the treated cells or batteries, could be obtained when a current is passed through the cells or batteries, which consists at the beginning of about 60–90% pure alternating current and 40–10% direct or pulsating direct current.

During the treatment the direct current component will gradually decrease as the counter E. M. F. of the cells or batteries increases. The alternating current component at the same time increases somewhat. The reactivation is finished when no further current alternations take place, that is to say, dependent of the adjustment, for instance after about 6–15 hours. Further continuation of the treatment has no use, but also it has no detrimental consequences.

With the above process preferably a current is used, of which the direct current voltage at the cells or batteries is adjusted in such a manner with the aid of the resistance for the alternating current, that the peak voltage of the cells or batteries to be treated cannot rise higher than the normal peak voltage. Hereby it is obtained that the batteries or cells are each time renewed without dangerous or inconvenient overvoltages being generated. In practice the treating current is suitably supplied in known manner by a source of alternating current of adequate voltage, and according to the invention the alternating current is partly rectified and the remainder fed as a preponderating pure alternating current through a resistance to the cells or batteries to be treated.

The invention also consists in the apparatus necessary for carrying the above process into effect, which apparatus consists of an alternating current circuit with rectifier, which can be closed through the cells or batteries to be treated, the treating circuit being such that a current is passed through the cells or batteries to be treated, consisting partly of alternating current and the remainder of direct or pulsating direct current. For charging or renewing normal commercial cells or batteries, the treating circuit can therefore include a rectifier with a very considerable leak (50–90%) or a rectifier bridged by a resistance. However, alternatively, the cell or battery, especially for the above treatment may be provided with a built-in resistance and an additional terminal. In this case an alternating current lead is provided in the treating circuit between the transformer and the rectifier, which lead is connected to the additional terminal of the cell or the battery with the built-in resistance.

The invention also consists in the primary dry electric cells or batteries made for the above treatment, provided with a built-in resistance with the covering mass, which resistance is connected at one end to a separate terminal lip, and at the other end to one of the terminal lips of the cell or battery.

Figure 2:
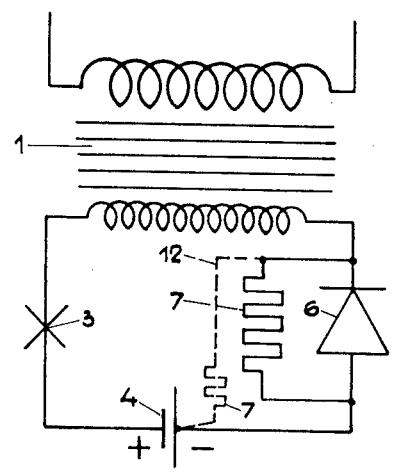
Figure 3:
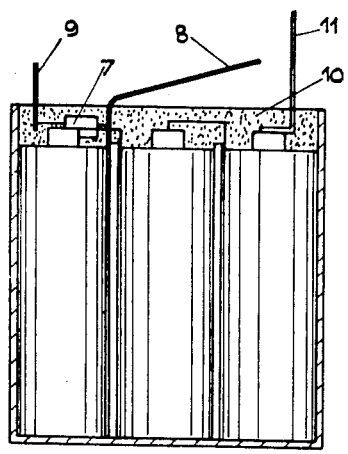
Figure 4:
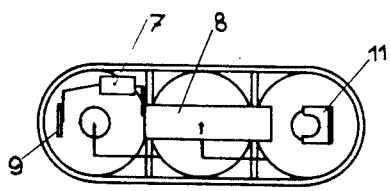

The invention will now be described by way of different examples with reference to the accompanying drawings, in which:

Figures 1 and 2 show a pair of circuit diagrams of treating circuits according to the invention, and Figures 3 and 4 show respectively a side elevation with omitted cover wall, and a top elevation with omitted covering mass, of a battery with built-in resistance for treatment according to the invention.

In Figure 1, the numeral 1 indicates a mains transformer to the secondary winding of which the treating circuit is connected, the latter including a half-wave rectifier 2, a control lamp 3 and the cell 4 to be treated. The rectifier in this case is assumed to be a rectifier with a great leak so that it lets through an adequate percentage of pure alternating current, which is diagrammatically shown by the resistance 5. As it is difficult to manufacture such rectifiers so that they are approximately equal, it is better to use a normal good rectifier 6, as shown in Figure 2, which is bridged by a resistance 7 of adequate value. This resistance may also be built-in in a cell or battery, as shown in Figures 3 and 4, specially manufactured for the treatment referred to. The negative contact terminal 8 in this case is removed from the outside of the last cell to the opposite side, while an additional contact terminal 9 is fixed in the covering mass 10, which contact terminal is connected with the negative contact terminal through the resistance 7. The positive contact terminal 11 is kept in its normal place. The contact terminal 9 is made shorter so as to be distinguishable from the positive contact terminal, and for the renewing treatment it is connected to the alternating current lead 12 indicated in dotted lines in Figure 2. If necessary, however, dependent of the direction of passage of the rectifier, the resistance may also be connected to the positive contact terminal.

The rectifier 6 may also consist of a tube rectifier.

In practice the terminal voltage of the treating circuit is suitably chosen slightly higher, e. g. 10%, than the peak voltage of the cell or battery to be treated; thus for instance, for a deaf aid battery with a nominal terminal voltage of 1.5 volt and a peak voltage of about 1.65 volt, the terminal voltage of the treating circuit is chosen at about 1.9–2 volts. An adequate resistance for the bridging resistance 7 would be about 250 to 400 ohms.

Experiments with dry hearing aid batteries and pocket lamp batteries have shown, that by a treatment according to the invention the life of such batteries can be lengthened to 20 to 30 times the normal life. With certain hearing aid batteries the life of which normally amounts to about 18 hours, this could be lengthened to about 300 hours by renewing for 12 hours after each 12 hour discharging. This means that compared with a useful life of only 1 natural day, the useful life could be lengthened to about 25 natural days.

Having now particularly described and ascertained the nature of my said invention and in what manner the same is to be performed I declare that what I claim is:

1. In a process for reactivating exhausted primary electric batteries having cases which are sealed gas tight, the steps of passing a unidirectional current through said battery in a direction opposite to the direction of current flow in use of said battery and simultaneously passing alternating current through said battery to suppress gas formation during reactivation of said battery, thereby effecting reactivation of said sealed battery without breaking the seal and without objectionable expansion of said case by internal gas pressure, said alternating current being greater than said unidirectional current.

2. A process according to claim 1, in which the current passed through said cell is initially about 60% to 90% alternating current and about 40% to 10% unidirectional current, the proportion of unidirectional current being decreased as reactivation of the cell progresses.

3. A process according to claim 1, in which the voltage applied to said cell is approximately 10% higher than the peak terminal voltage of said cell.

References Cited in the file of this patent

UNITED STATES PATENTS

| 1,099,381 | Krafft | June 9, 1914 |
|---|---|---|
| 1,219,411 | Williams | Mar. 13, 1917 |
| 2,199,322 | Skinner | Apr. 30, 1940 |
| 2,222,196 | Vilkomerson | Nov. 19, 1940 |
| 2,369,033 | Eubank | Feb. 6, 1945 |
| 2,422,925 | Rady et al. | June 24, 1947 |
| 2,448,349 | Black | Aug. 31, 1948 |
| 2,566,969 | Sorensen | Sept. 4, 1951 |
| 2,653,988 | Rupp | Sept. 29, 1953 |

FOREIGN PATENTS

| 768,846 | France | Aug. 14, 1934 |
|---|---|---|
| 809,148 | France | Dec. 3, 1936 |

OTHER REFERENCES

Radiocraft Magazine, pages 51, 53 and 54, July 1941.
Electronics Magazine, pages 148, 152, and 154, Oct. 1943.
Electrical World Magazine, page 116, Feb. 3, 1945.
Popular Science Magazine, pages 228 and 229, Sept. 1948.